UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

MANUFACTURE OF SILICON CARBID.

1,013,701.  Specification of Letters Patent.  Patented Jan. 2, 1912.

No Drawing.  Application filed July 10, 1908.  Serial No. 442,902.

*To all whom it may concern:*

Be it known that I, FRANK J. TONE, of Niagara Falls, Niagara county, New York, have invented a new and useful Improvement in the Manufacture of Silicon Carbid, of which the following is a specification.

My invention relates to the manufacture of silicon carbid, and especially refers to the making of silicon carbid in a dense, compacted form.

According to the well known method of manufacture of silicon carbid, a mixture of pulverized coke, sand, salt and sawdust, is subjected to great heat in an electric furnace. The resulting product is a loose aggregation of crystals of various sizes with a considerable proportion of interstices in the crystal mass.

I have discovered that by placing porous masses of silicon carbid in or in contact with silicon and heating the masses to the temperature required for the formation of silicon carbid the silicon will penetrate the pores of the mass, compact it, and cement it into a dense form consisting of silicon carbid and free silicon. I have found that aggregations of silicon carbid crystals may be converted into a dense form of silicon carbid by submitting them to the action of vapors of silicon and causing the silicon to penetrate the pores of the crystalline mass and there condense and combine with the silicon carbid.

In the practice of my invention care should be taken not to carry the temperature to a point sufficiently high to decompose the resulting product and convert it into graphite.

The subject-matter of this application is analogous to that of my Patent 913,324, February 23, 1909.

I claim:—

1. The process of making dense silicon carbid which consists in heating silicon carbid in proximity to silicon and allowing the silicon to penetrate the pores of the silicon carbid and cement it together.

2. The process of making dense silicon carbid which consists in heating porous aggregations of silicon carbid crystals in proximity to vapors of silicon, and causing the silicon to penetrate and condense in the pores of the crystalline silicon carbid mass.

3. The process of making dense silicon carbid which consists in causing free silicon to form in a disseminated state throughout a silicon carbid mass.

4. As a new article of manufacture, a shaped piece of silicon carbid of great density and compactness and having silicon deposited in the pores thereof; substantially as described.

5. As a new article of manufacture, silicon carbid of great density and compactness and having silicon deposited in the pores thereof; substantially as described.

6. As a new article of manufacture, dense compacted silicon carbid consisting of silicon carbid crystals cemented together by silicon; substantially as described.

7. As a new article of manufacture, a form containing silicon carbid and silicon; substantially as described.

In testimony whereof, I have hereunto set my hand.

FRANK J. TONE.

Witnesses:
ASHMEAD G. RODGERS,
EDMUND S. SMITH.